United States Patent
Sakamoto et al.

(10) Patent No.: US 9,403,118 B2
(45) Date of Patent: Aug. 2, 2016

(54) NITROGEN-ENRICHED GAS MANUFACTURING METHOD, GAS SEPARATION METHOD AND NITROGEN-ENRICHED GAS MANUFACTURING APPARATUS

(75) Inventors: Hidehisa Sakamoto, Kofu (JP); Makiya Kokubu, Suzhou (CN)

(73) Assignee: TAIYO NIPPON SANSO CORPORATION, Tokyo (JP)

( * ) Notice: Subject to any disclaimer, the term of this patent is extended or adjusted under 35 U.S.C. 154(b) by 50 days.

(21) Appl. No.: 14/375,003

(22) PCT Filed: Apr. 9, 2012

(86) PCT No.: PCT/JP2012/059699
§ 371 (c)(1),
(2), (4) Date: Jul. 28, 2014

(87) PCT Pub. No.: WO2013/114637
PCT Pub. Date: Aug. 8, 2013

(65) Prior Publication Data
US 2015/0007724 A1    Jan. 8, 2015

(30) Foreign Application Priority Data
Jan. 30, 2012  (JP) ................................. 2012-016575

(51) Int. Cl.
*B01D 53/053* (2006.01)
*B01D 53/047* (2006.01)
*C01B 21/04* (2006.01)

(52) U.S. Cl.
CPC ............ *B01D 53/047* (2013.01); *B01D 53/053* (2013.01); *C01B 21/045* (2013.01);
(Continued)

(58) Field of Classification Search
CPC .............. B01D 53/047; B01D 53/053; B01D 2256/10; B01D 2257/104; B01D 2257/504; B01D 2259/40015; B01D 2259/4003; B01D 2259/40037; B01D 2259/40062; B01D 2259/40066; B01D 2259/402; C01B 21/045; C01B 2210/0045; C01B 2210/0051; Y02C 10/08

USPC ................................. 95/96, 103, 138; 96/121
See application file for complete search history.

(56) References Cited

U.S. PATENT DOCUMENTS 4,576,614 A    3/1986  Armond et al.
4,810,265 A *  3/1989  Lagree ............... B01D 53/0476
                                                           95/101

(Continued)

FOREIGN PATENT DOCUMENTS

JP    57-105221    6/1982
JP    59-186627    10/1984

(Continued)

OTHER PUBLICATIONS

Machine-generated English translation of JP 2001-276550 A, published Oct. 2001.*
Machine-generated English translation of JP 2002-045635 A, published Feb. 2001.*
International Search Report for PCT/JP2012/059699, mailed Jul. 31, 2012.

(Continued)

*Primary Examiner* — Frank Lawrence
(74) *Attorney, Agent, or Firm* — Nixon & Vanderhye P.C.

(57) ABSTRACT

A nitrogen-enriched gas manufacturing method and a nitrogen-enriched gas manufacturing apparatus which minimize variations in the compressor load in order to ensure satisfactory utilization of the performance of the compressor. Specifically, a nitrogen-enriched gas manufacturing method for separating a nitrogen-enriched gas from a raw material air containing nitrogen gas using a plurality of adsorption tanks packed with an adsorbent the method including a pressurization and adsorption step, a depressurization and equalization step, a depressurization and regeneration step, and a pressurization and equalization step, wherein in the pressurization or depressurization and equalization step, the raw material air which has been compressed by the compressor is stored in a compressed raw material air tank provided on a branch line between the compressor and the adsorption tanks, and in the pressurization and adsorption step, the raw material air stored in the compressed raw material air tank is introduced into the adsorption tank and used as a portion of the gas that pressurizes the inside of the adsorption tank.

3 Claims, 8 Drawing Sheets

(52) U.S. Cl.
CPC ....... *B01D2256/10* (2013.01); *B01D 2257/104* (2013.01); *B01D 2257/504* (2013.01); *B01D 2259/402* (2013.01); *B01D 2259/4003* (2013.01); *B01D 2259/40015* (2013.01); *B01D 2259/40037* (2013.01); *B01D 2259/40062* (2013.01); *B01D 2259/40066* (2013.01); *C01B 2210/0045* (2013.01); *C01B 2210/0051* (2013.01); *Y02C 10/08* (2013.01); *Y02P 20/152* (2015.11); *Y02P 30/30* (2015.11)

(56) References Cited

U.S. PATENT DOCUMENTS

| | | | | |
|---|---|---|---|---|
| 2005/0199122 | A1* | 9/2005 | Urakami | B01D 53/047 95/96 |
| 2014/0326138 | A1* | 11/2014 | Koch | B01D 53/04 95/96 |

FOREIGN PATENT DOCUMENTS

| | | |
|---|---|---|
| JP | 2001-276550 | 10/2001 |
| JP | 2002-45635 | 2/2002 |
| JP | 2010-180067 | 8/2010 |
| JP | 2011-156530 | 8/2011 |
| KR | 10-2008-0107262 | 12/2008 |

OTHER PUBLICATIONS

Le (Editor), "Special Experiment for Chemical Engineering and Technology," Mar. 31, 2008, Chemical Indust Press, Beijing, pp. 201-203, $2^{nd}$ edition.

Chinese Office Action issued in App. No. 201280067963.2 dated Oct. 8, 2015 (w/ translation).

Korean Office Action issued in Application No. 10-2014-7020851 dated Apr. 29, 2016 (w/ translation).

* cited by examiner

---Prior Art---

FIG. 8

---Prior Art---

NITROGEN-ENRICHED GAS MANUFACTURING METHOD, GAS SEPARATION METHOD AND NITROGEN-ENRICHED GAS MANUFACTURING APPARATUS

TECHNICAL FIELD

The present invention relates to a nitrogen-enriched gas manufacturing method, a gas separation method and a nitrogen-enriched gas manufacturing apparatus. The present application is the U.S. national phase of International Application No. PCT/JP2012/059699, filed on Apr. 9, 2012, which designated the U.S. and priority is claimed on Japanese Patent Application No. 2012-016575, filed Jan. 30, 2012, the content of each of which are incorporated herein by reference.

BACKGROUND ART

Generally, gases rich in nitrogen (hereafter referred to as "nitrogen-enriched gas") which have been separated and purified from raw material air containing nitrogen (hereafter referred to as simply "raw material air") using the pressure swing adsorption (PSA) method are used in many different applications, including as purge gases for explosion prevention and as atmospheric gases for heat treatment furnaces.

In the separation and purification of a nitrogen-enriched gas by the PSA method, electricity is used exclusively as the power source, but in recent years, there have been growing demands for greater power saving, aimed at reducing running costs and achieving better energy saving.

Figure 7:
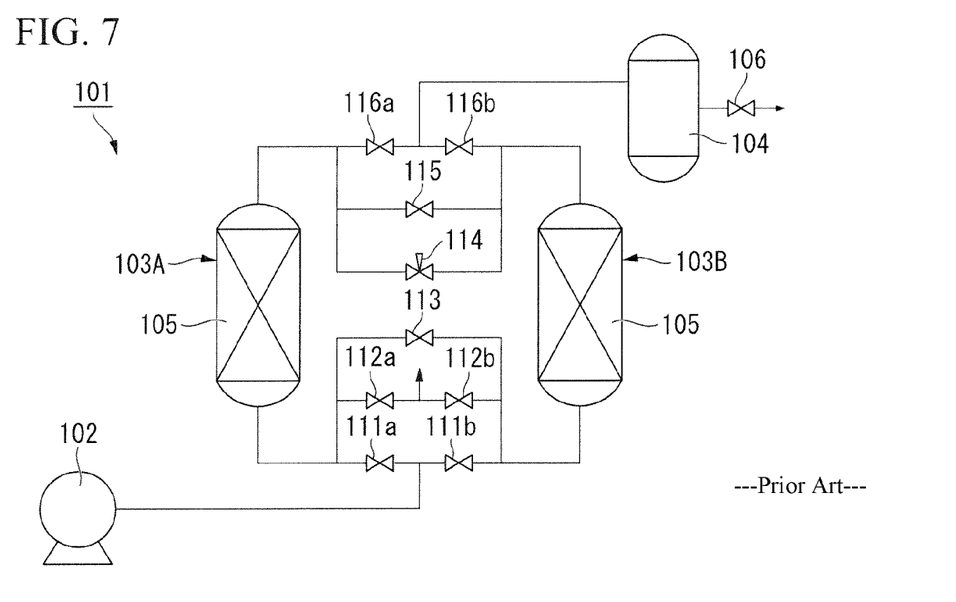
FIG. 7 is a system diagram illustrating an outline of a conventional nitrogen-enriched gas manufacturing apparatus.

Conventionally known examples of this type of nitrogen-enriched gas manufacturing apparatus using the PSA method (hereafter also referred to as a "nitrogen PSA apparatus") include the type of apparatus illustrated in FIG. 7.

As illustrated in FIG. 7, a nitrogen PSA apparatus 101 includes a raw material air compressor 102 for pressurizing the raw material air, two adsorption tanks (a first adsorption tank 103A and a second adsorption tank 103B), and a product tank 104.

Further, automatic switching on-off valves 111a, 111b, 116a and 116b are provided on the side of the adsorption tanks 103A and 103B to which the raw material air compressor 102 is connected (hereafter referred to as "the upstream side"), and the side of the adsorption tanks 103A and 103B to which the product tank 104 is connected (hereafter referred to as "the downstream side") respectively, and the nitrogen PSA apparatus 101 is also provided with automatic switching on-off valves 112a, 112b, 113 and 115, and a flow rate regulating valve 114 which can regulate the flow rate. Further, an automatic switching on-off valve 106 is also provided at the outlet side of the product tank 104.

Furthermore, the two adsorption tanks 103A and 103B are packed with an adsorbent 105 which preferentially adsorbs unwanted components such as oxygen and carbon dioxide within the compressed raw material air delivered from the raw material air compressor 102.

One known method for separating a nitrogen-enriched gas from a raw material air using this type of nitrogen PSA apparatus 101 is a method that involves repeating a pressurization and adsorption step, a depressurization and equalization step, a depressurization and regeneration step, and a pressurization and equalization step.

In the case of this method, when one of the first adsorption tank 103A and the second adsorption tank 103B is performing the pressurization and adsorption step, the other is performing the depressurization and regeneration step, and when one is performing the depressurization and equalization step, the other is performing the pressurization and equalization step. Accordingly, in the first adsorption tank 103A, when the pressurization and adsorption step, the depressurization and equalization step, the depressurization and regeneration step, and the pressurization and equalization step are performed in that order, in the second adsorption tank 103B, the steps are performed in the order of the depressurization and regeneration step, the pressurization and equalization step, the pressurization and adsorption step, and the depressurization and equalization step. The following description describes the steps for the first adsorption tank 103A.

First, in the pressurization and adsorption step, the compressed raw material air that has been pressurized by the raw material air compressor 102 is introduced into the first adsorption tank 103A, the inside of the first adsorption tank 103A is pressurized, and the unwanted components within the raw material air are adsorbed preferentially to the adsorbent 105, yielding a nitrogen-enriched gas. Next, in the depressurization and equalization step, the relatively high-pressure gas remaining inside the first adsorption took 103A is introduced into the second adsorption tank 103B.

Subsequently, in the depressurization and regeneration step, the first adsorption tank 103A is opened to the atmosphere, thereby reducing the pressure inside the first adsorption tank 103A, desorbing the unwanted components adsorbed to the adsorbent 105, and discharging these unwanted components outside the first adsorption tank 103A. At this time, the nitrogen-enriched gas extracted from the downstream side of the second adsorption tank 103B, which is performing the pressurization and adsorption step, is preferably introduced into the first adsorption tank 103A through the downstream side of the first adsorption tank 103A, thereby accelerating the desorption of the unwanted components.

In the pressurization and equalization step, the relatively high-pressure gas remaining inside the second adsorption tank 103B, which has completed the pressurization and adsorption step, is introduced into the first adsorption tank 103A, which has completed the depressurization and regeneration step.

In a more detailed description based on FIG. 7, when the first adsorption tank 103A is performing the pressurization and adsorption step (namely, when the second adsorption tank 103B is performing the depressurization and regeneration step), the on-off valves 111a, 112b and 116a are open, and the other on-off valves are closed.

Accordingly, the compressed raw material air that has been compressed by the raw material air compressor 102 passes through the on-off valve 111a and into the first adsorption tank 103A.

The unwanted components such as oxygen and carbon dioxide within the compressed raw material air that has been introduced into the first adsorption tank 103A are adsorbed to the adsorbent 105, thereby producing a nitrogen-enriched gas that is rich in nitrogen, and this nitrogen-enriched gas passes through the on-off valve 116a and is fed into the product tank 104 as a product gas. At this time, a portion of the nitrogen-enriched gas passes through the flow rate regulating valve 114 and into the second adsorption tank 103B, where it is used for regenerating the adsorbent 105 inside the second adsorption tank 103B.

Subsequently, when the first adsorption, tank 103A enters the depressurization and equalization step and the second adsorption tank 103B enters the pressurization and equalization step, the on-off valves 113 and 115 are opened, and the other on-off valves are closed.

Accordingly, in this depressurization and equalization step, the relatively high-pressure gas remaining inside the first adsorption tank 103A is supplied from the first adsorption tank 103A to the second adsorption tank 103B through the on-off valves 113 and 115.

Next, by opening the on-off valves 111b, 112a and 116b, and closing the other on-off valves, the first adsorption tank 103A enters the depressurization and regeneration step, and the second adsorption tank 103B enters the pressurization and adsorption step.

In these steps, residual gas inside the first adsorption tank 103A is released into the atmosphere through the on-off valve 112a, and as the pressure inside the first adsorption tank 103A decreases, the unwanted components adsorbed to the adsorbent 105 inside the first adsorption tank 103A desorb. At this time, a portion of the nitrogen-enriched gas discharged from the second adsorption tank 103B passes through the flow regulating valve 114 and into the interior of the first adsorption tank 103A, and is used as a purge gas for regenerating the adsorbent 105 inside the first adsorption tank 103A.

Subsequently, by opening the on-off valves 113 and 115, and closing the other on-off valves, the first adsorption tank 103A enters the pressurization and equalization step, and the second adsorption tank 103B enters the depressurization and equalization step.

In these steps, the relatively high-pressure gas (pressure equalization gas) inside the second adsorption tank 103B is supplied from the second adsorption tank 103B to the first adsorption tank 103A.

By repeating the above steps, a nitrogen-enriched gas is separated from the raw material air.

By the way, during the press urination and equalization step and the depressurization and equalization step, because the on-off valves 111a and 111b are closed, the compressed raw material air cannot be supplied from the raw material air compressor 102 to the adsorption tanks 103A and 103B, meaning a rapid increase in pressure occurs at the outlet of the raw material air compressor 102.

Figure 8:
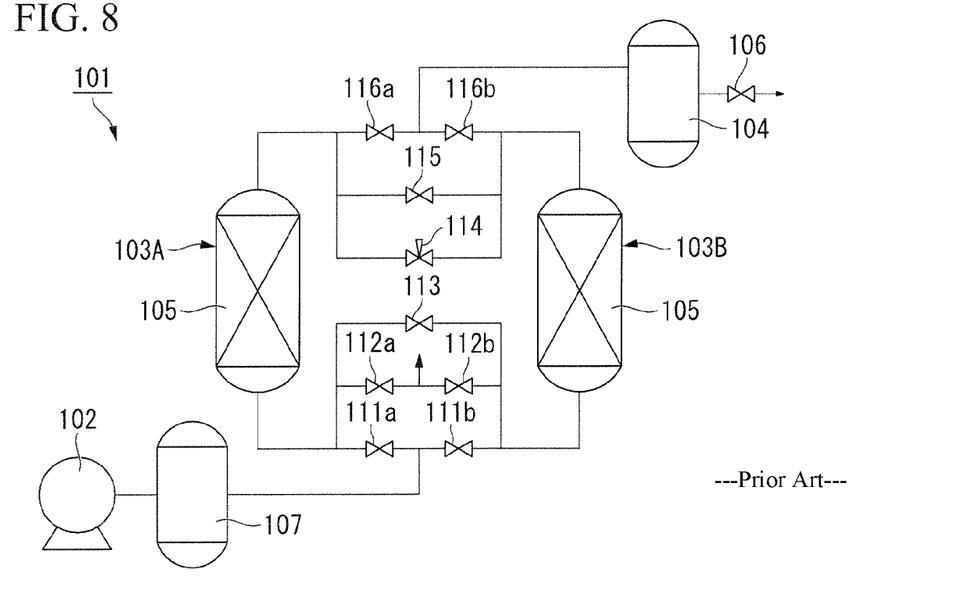
FIG. 8 is a system diagram illustrating an outline of a conventional nitrogen-enriched gas manufacturing apparatus.

Accordingly, in order to prevent this rapid increase hi pressure caused by the closing, of the on-off valves 111a and 111b of the nitrogen PSA apparatus 101, a compressed raw material air tank 107 is sometimes provided downstream from the raw material air compressor 102 as illustrated in FIG. 8.

Furthermore, in one known method of effectively utilizing the compressed raw material air using the compressed raw material air tank 107, the pressure inside the compressed raw material air tank 107 is continually monitored, and the rate of revolution of the motor of the raw material air compressor 102 is controlled accordingly (see Patent Document 1).

DOCUMENTS OF RELATED ART

Patent Document

Patent Document 1: Japanese Unexamined Patent Application, First Publication No. 2011-156530

SUMMARY OF THE INVENTION

Problems to be Solved by the Invention

However, in a method using the type of compressed raw material air tank 107 illustrated in FIG. 8, in those cases where the pressure inside the first adsorption tank 103A or the second adsorption tank 103B immediately before the pressurization and equalization step or the depressurization and equalization step is similar to the maximum working pressure of the raw material air compressor 102 (in other words, when the pressure inside the compressed raw material air tank 107 is similar to the maximum working pressure of the raw material air compressor 102), the compressed raw material air tank 107 is unable to contribute to preventing pressure increases during the pressure equalization step.

Further, by using a raw material air compressor 102 having a no-load operation mechanism, the raw material air compressor 102 can be switched to no-load operation during the pressure equalization steps to prevent pressure increases, but a problem arises in that once the raw material air compressor 102 has been switched to no-load operation, considerable time is required to switch the raw material air compressor 102 back to normal load operation. In addition, by switching the raw material air compressor 102 to no-load operation, the pressure increase inside the absorption tank during the pressurization and adsorption step slows, and the performance of the compressor cannot be utilized satisfactorily. Moreover, the volume that must be pressurized by the raw material air compressor 102 increases by the volume of the compressed raw material air tank 107, which is disadvantageous in terms of increasing the pressure during the pressurization and adsorption step, and tends to cause a deterioration in the PSA performance.

Further, in the method disclosed in Patent Document 1, an inverter control system must be employed to ensure effective utilization of the raw material air compressor 102, but this raises the problem of increased costs.

In addition, when this type of control system is employed, because the on-off valves 111a and 111b on the upstream sides of the first adsorption tank 103A and the second adsorption tank 103B are closed during the pressure equalization steps, the rate of revolution of the raw material air compressor 102 most be lowered. As a result, the performance of the compressor cannot be satisfactorily utilized, leading to an increase in the required air flow capacity of the raw material air compressor 102 that must be selected. This not only causes an increase in the size of the apparatus, but is also undesirable from the viewpoint of power saving.

Against this type of background, an operating method and apparatus which enable the performance of the compressor to be satisfactorily utilized is desirable from the viewpoints of power saving, reduced costs, and saving space, and therefore a method which minimizes load variations for the compressor and enables a more continuous operation is required, but no such method has yet been proposed.

The present invention has an object of providing a method and an apparatus that address the problems described above.

Means to Solve the Problems

In order to address the problems outlined above, the present invention provides the aspects described below. The following description is based on the steps for the first adsorption tank.

A first aspect of the invention is a nitrogen-enriched gas manufacturing method for separating a nitrogen-enriched gas from a raw material air containing nitrogen gas using a plurality of adsorption tanks packed with an adsorbent, the method including a pressurization and adsorption step of pressurizing the inside of a first adsorption tank by introducing the raw material air, which has been compressed by a compressor, into the first adsorption tank, and preferentially adsorbing unwanted components such as oxygen and carbon dioxide within the raw material air to an adsorbent inside the first adsorption tank, thus obtaining a gas containing concentrated nitrogen, a depressurization and equalization step of introducing residual gas remaining inside the first adsorption tank into a second adsorption tank, a depressurization and regeneration step of introducing the raw material air which has been compressed by the compressor into the second adsorption tank, lowering the pressure inside the first adsorption tank by opening the first adsorption tank to the atmosphere, and desorbing the unwanted components from the adsorbent inside the first adsorption tank, thereby regenerating the adsorbent inside the first adsorption tank, and a pressurization and equalization step of introducing residual gas remaining inside the second adsorption tank into the first adsorption tank, wherein in the pressurization and equalization step, the raw material air which has been compressed by the compressor is stored in a compressed raw material air tank provided on a branch from a line between the compressor and the first adsorption tank, and in the pressurization and adsorption step, the raw material air stored in the compressed raw material air tank is introduced into the first adsorption tank and used as a portion of the gas for pressurizing the inside of the first adsorption tank.

Further, a second aspect of the invention is a gas separation method of separating an easily adsorbed component which adsorbs readily to an adsorbent, and a poorly adsorbed component which adsorbs poorly to the adsorbent, from a raw material gas containing the easily adsorbed component and the poorly adsorbed component, using a plurality of adsorption tanks packed with the adsorbent, the method including a pressurization and adsorption step of pressurizing the inside of a first adsorption tank by introducing the raw material gas, which has been compressed by a compressor, into the first adsorption tank, and preferentially adsorbing the easily adsorbed component within the raw material gas to the adsorbent inside the first adsorption tank, thus obtaining a gas in which the poorly adsorbed component has been concentrated, a depressurization and equalization step of introducing a relatively high-pressure gas remaining inside the first adsorption tank into a second adsorption tank, a depressurization and regeneration step of introducing the raw material gas which has been compressed by the compressor into the second adsorption tank, lowering the pressure inside the first adsorption tank by opening the first adsorption tank to the atmosphere, and desorbing the easily adsorbed component from the adsorbent inside the first adsorption tank, thereby regenerating the adsorbent inside the first adsorption tank, and a pressurization and equalization step of introducing residual gas remaining inside the second adsorption tank into the first adsorption tank, wherein in the pressurization and equalization step, the raw material gas which has been compressed by the compressor is stored in a compressed raw material gas tank provided on a branch from a line between the compressor and the first adsorption tank, and in the pressurization and adsorption step, the compressed raw material gas stored in the compressed raw material gas tank is introduced into the first adsorption tank and used as a portion of the gas for pressurizing the inside of the first adsorption tank.

Furthermore, a third aspect of the invention is a nitrogen-enriched gas manufacturing apparatus for separating a nitrogen-enriched gas from a raw material air containing nitrogen gas using a plurality of adsorption tanks packed with an adsorbent, the apparatus containing a compressor which compresses the raw material air, a plurality of adsorption tanks into which the raw material air that has been compressed by the compressor is introduced, a line which connects the compressor and the adsorption tanks, a branch line which is provided as a branch from the aforementioned line, and a compressed raw material air tank which is connected to the branch line, wherein the compressed raw material air tank has a function of storing the raw material air that has been compressed by the compressor when the adsorption tanks are not being supplied with compressed raw material air from the compressor, or when the flow rate of the compressed raw material air is being restricted, and also has a function of supplying the raw material air that has been stored inside the compressed raw material air tank to the adsorption tank to act as a portion of the pressurizing gas when the inside of the adsorption tank is being pressurized.

Effects of the Invention

According to the present invention, the raw material air compressor can be used stably in a continuous manner rather than intermittently, and the maximum (rated) air flow capacity of the compressor can be reduced, resulting in better power saving for the nitrogen PSA apparatus.

BEST MODE FOR CARRYING OUT THE INVENTION

A nitrogen-enriched gas manufacturing apparatus and a nitrogen-enriched gas manufacturing method applicable to the present invention are described below in detail using the drawings.

<Nitrogen-Enriched Gas Manufacturing Apparatus>

Figure 1:
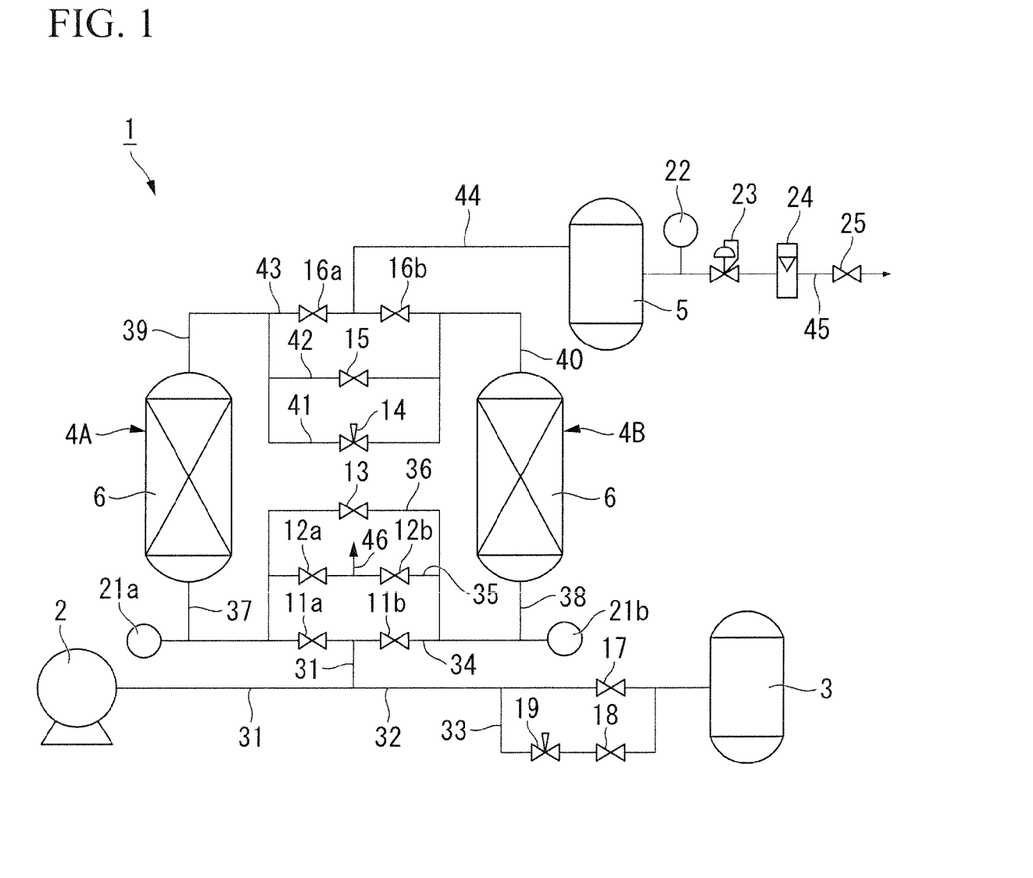
FIG. 1 is a system diagram illustrating an outline of a nitrogen-enriched gas manufacturing apparatus according to an embodiment of the present invention.

A nitrogen-enriched gas manufacturing apparatus 1 of this embodiment is a manufacturing apparatus using the PSA method and, as illustrated in FIG. 1, has a structure including a raw material air compressor 2, a compressed raw material an tank 3, two adsorption tanks (a first adsorption tank 4A and a second adsorption tank 4B), and a product tank 5.

The raw material air compressor 2 is a device which compresses the raw material air, and is connected to the first adsorption tank 4A through an inlet valve 11a and lines 31, 34 and 37, and to the second adsorption tank 4B through an inlet valve 11b and lines 31, 34 and 38.

Further, the first adsorption tank 4A and the second adsorption tank 4B are packed with an adsorbent 6 which adsorbs the unwanted components such as oxygen and carbon dioxide gas preferentially to the nitrogen within the raw material. This adsorbent 6 preferably uses a molecular sieve activated carbon.

Pressure gauges 21a and 21b which measure the pressure of the gas introduced into the first adsorption tank 4A and the second adsorption tank 4B respectively are provided in the lines 37 and 38 respectively.

The compressed raw material air tank 3 is connected to the raw material air compressor 2 via a branch line 32 provided as a branch off the line 31. Further, the compressed raw material air tank 3 is connected to the first adsorption tank 4A through the inlet valve 11a and the lines 32, 31, 34 and 37, and to the second adsorption tank 4B through the inlet valve 11b, the branch line 32, and the lines 31, 34 and 38.

In other words, the compressed raw material air tank 3 is provided on a branch line between the raw material air compressor 2 and the adsorption tanks 4A and 4B.

A compressed raw material air tank inlet valve 17 is provided as an automatic switching on-off valve in the branch line 32, and a separate line 33 is provided so as to connect the upstream and downstream sides of this compressed raw material air tank inlet valve 17.

A pressure gauge (not shown in the figure) which measures the pressure inside the compressed raw material air tank 3 is also provided in the compressed raw material air tank 3.

As described below, this compressed raw material air tank 3 has a function of storing the raw material air that has been compressed by the compressor 2 when the first adsorption tank 4A and the second adsorption tank 4B are not receiving compressed raw material air from the compressor 2, or when the flow rate of the compressed raw material air is being restricted. In addition, the compressed raw material, air tank 3 also has a function of supplying the raw material air that has been stored inside the compressed raw material air tank 3 to the first adsorption tank 4A or the second adsorption tank 4B to act as a portion of the pressurizing gas when the inside of the first adsorption tank 4A or the second adsorption tank 4B are being pressurized.

Furthermore, a compressed raw material air tank outlet valve 18 and a compressed raw material air tank outlet flow rate regulating mechanism 19 are provided in sequence in the line 33, with the compressed raw material air tank outlet valve 18 positioned closer to the compressed raw material air tank 3.

The compressed raw material air tank outlet valve 18 may be an on-off valve or a check valve, whereas the compressed raw material air tank outlet flow rate regulating mechanism 19 may have any structure that enables regulation of the flow, such as a needle valve or a device that alters the orifice or line diameter. Further, the compressed raw material air tank outlet valve 18 and the compressed raw material air tank outlet flow rate regulating mechanism 19 may be replaced with a single mechanism such as a controllable flow rate regulating valve.

The product tank 5 is a tank for storing the nitrogen-enriched gas discharged from the first adsorption tank 4A and the second adsorption tank 4B, and is connected to the first adsorption tank 4A through an outlet valve 16a and lines 39, 43 and 44, and to the second adsorption tank 4B through an outlet valve 16b and lines 40, 43 and 44.

The product gas stored inside the product tank 5 can be discharged for supply to a desired application through a line 45 in which a product gas outlet valve 25 is provided.

Further, an oxygen concentration meter 22 which measures the oxygen concentration of the product gas, a product pressure reducing valve 23 which adjusts the pressure of the product gas, and a product gas flow meter 24 which measures the flow rate of the product gas are provided in the line 45.

Further, the upstream side and the downstream side of the first adsorption tank 4A are connected to the upstream side and the downstream side respectively of the second adsorption tank 4B.

The upstream side of the first adsorption tank 4A and the upstream side of the second adsorption tank 4B are connected via the line 37 and the line 38, and the line 37 and the line 38 are connected by three lines 34, 35 and 36.

The inlet valves 11a and 11b, which are on-off valves, are provided in the line 34, and a line 31 is connected to the line 34 between these inlet valves 11a and 11b.

Further, exhaust valves 12a and 12b, which are also on-off valves, are provided in the line 35, and a line 46 that leads to the open atmosphere is connected to the line 35 between these exhaust valves 12a and 12b.

Furthermore, a pressure equalizing valve 13, which is an on-off valve, is provided in the line 36.

Further, the downstream side of the first adsorption tank 4A and the downstream side of the second adsorption tank 4B are connected via the line 39 and the line 40, and the line 39 and the line 40 are connected by three lines 41, 42 and 43.

A flow rate regulating mechanism 14 which regulates the flow rate of the regeneration gas is provided In the line 41, and a pressure equalizing valve 15 which is an on-off valve is provided in the line 42. The flow rate regulating mechanism 14 may have any structure that enables regulation of the flow, such as a needle valve or a device that alters the orifice or line diameter.

Further, the outlet valves 16a and 16b are provided in the line 43, and the line 44 is connected to the line 43 between the outlet valve 16a and the outlet valve 16b.

The inlet valves 11a and 11b, the exhaust valves 12a and 12b, the pressure equalizing valves 13 and 15, the outlet valves 16a and 16b, the compressed raw material air tank inlet valve 17, and the compressed raw material air tank outlet valve 18 are able to be opened and closed automatically by a switching program during each of the steps described below.

<Nitrogen-Enriched Gas Manufacturing Method>

Next is a description of a nitrogen-enriched gas manufacturing method according to the present embodiment.

The nitrogen-enriched gas manufacturing method of this embodiment is a method that involves repeating a pressurization and adsorption step, a depressurization and equalization step, a depressurization and regeneration step, and a pressurization and equalization step.

Further, the first adsorption tank 4A and the second adsorption tank 4B adopt a relationship such that when one is performing the pressurization and adsorption step, the other is performing the depressurization and regeneration step, and when one is performing the depressurization and equalization step, the other is performing the pressurization and equalization step. The following description focuses on the steps performed in the first adsorption tank 4A.

First, in the pressurization and adsorption step, the raw material air that has been pressurized by the raw material air compressor 2 is introduced into the first adsorption tank 4A, the inside of the first adsorption tank 4A is adjusted to a prescribed pressure, and the readily adsorbed unwanted components such as oxygen and carbon dioxide within the raw material air are adsorbed preferentially to the adsorbent 6, while the poorly adsorbed nitrogen-enriched gas is discharged into the product tank 5.

Subsequently, in the depressurization and equalization step, the relatively high-pressure gas remaining inside the first adsorption tank 4A is introduced into the second adsorption tank 4B.

Next, in the depressurization and regeneration step, the first adsorption tank 4A is opened to the atmosphere, thereby reducing the pressure, desorbing the unwanted components such as oxygen and carbon dioxide adsorbed to the adsorbent 6, and regenerating the adsorbent 6. At this time, it is preferable that the nitrogen-enriched gas extracted from the downstream side of the second adsorption tank 4B, which is performing the pressurization and adsorption step, is introduced through the downstream side of the first adsorption task 4A and introduced into the first adsorption tank 4A, thereby accelerating the desorption of the unwanted components.

Then, in the pressurization and equalization step, the relatively high-pressure gas remaining inside the second adsorption tank 4B is introduced into the first adsorption tank 4A.

The first adsorption tank 4A then shifts to the pressurization and adsorption step again, and by repeating the steps described above, a nitrogen-enriched gas is separated from the raw material air. In other words, by repeating the steps of adsorption and regeneration in an alternating manner in the first adsorption tank 4A and the second adsorption tank 4B, a nitrogen-enriched gas is produced continuously from the raw material air.

The nitrogen-enriched gas manufacturing method using the nitrogen-enriched gas manufacturing apparatus 1 described above is described below in further detail with reference to FIG. 2 (FIG. 2A to FIG. 2F) and Table 1.

FIG. 2A to FIG. 2F are diagrams illustrating the steps of an operation 1 through to an operation 6 respectively, and in these figures, arrows indicate the direction of gas flow, and the bold lines indicate the lines through which the gas is flowing.

Figure 2A:
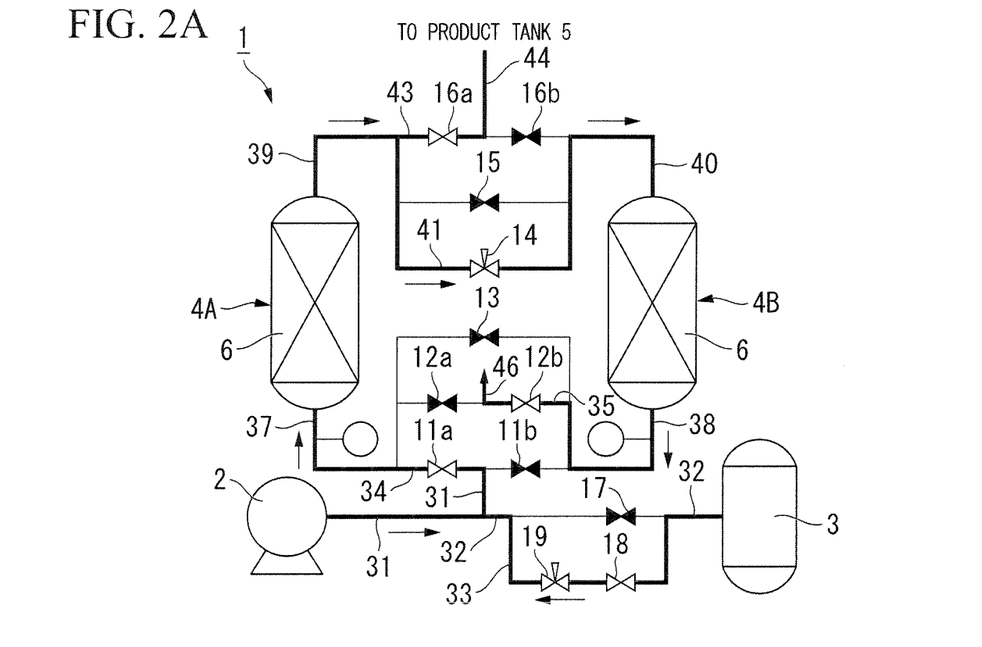
FIG. 2A is a process diagram showing the flow during an operation 1 of a nitrogen-enriched gas manufacturing method according to an embodiment of the present invention.

Further, Table 1 illustrates the states of the raw material air compressor, the compressed raw material air tank, the first adsorption tank and the second adsorption tank during each of the steps.

adsorption step, and the second adsorption tank 4B is in the state of performing the depressurization and regeneration step. Specifically, the inlet valve 11*a*, the exhaust valve 12*b*, the outlet valve 16*a*, and the compressed raw material air tank outlet valve 18 are open, and the other on-off valves are closed.

In this operation 1, because the inlet valve 11*a* is open, the compressed raw material air that has been compressed by the raw material air compressor 2 passes through the lines 31, 34 and 37 and into the first adsorption tank 4A, thereby pressurizing the inside of the first adsorption tank 4A. Then, the unwanted components such as oxygen and carbon dioxide within the raw material air are adsorbed preferentially to the adsorbent 6 inside the first adsorption tank 4A, yielding a nitrogen-enriched gas in which the nitrogen has been concentrated. Because the outlet valve 16*a* is open, this obtained nitrogen-enriched gas is discharged from the first adsorption tank 4A, and passes through the lines 39, 43 and 44 into the product tank 5.

Meanwhile, because the exhaust valve 12*b* is open, the second adsorption tank 4B is open to the atmosphere via the lines 38, 35 and 46, and therefore the pressure inside the second adsorption tank 4B decreases, and the unwanted components desorb from the adsorbent 6 inside the second adsorption tank 4B, thus regenerating the adsorbent 6.

At this time, a portion of the nitrogen-enriched gas discharged from the first adsorption tank 4A passes through the lines 39, 41 and 40, at a flow rate regulated by the flow rate regulating mechanism 14, and enters the second adsorption tank 4B from the downstream side of the second adsorption tank 4B. This introduced nitrogen-enriched gas purges the inside of the second adsorption tank 4B, thereby accelerating the regeneration of the adsorbent 6 inside the second adsorption tank 4B.

Further, because the compressed raw material air tank outlet valve 18 is open, the raw material air stored in the compressed raw material air tank 3 passes through the branch line 32 and the lines 33, 31, 34 and 37, at an appropriate flow rate regulated by the compressed raw material air tank outlet flow rate regulating mechanism 19, and is introduced into the first adsorption tank 4A and used as a portion of the gas for pressurizing the first adsorption tank 4A.

In other words, in the operation 1, supply of the compressed raw material air to the first adsorption tank 4A occurs from both the raw material air compressor 2 and the compressed raw material air rank 3.

Because the compressed raw material air tank outlet flow rate regulating mechanism 19 is provided, the flow rate of the compressed raw material air supplied from the compressed

TABLE 1

|  | Operation 1 | Operation 2 | Operation 3 | Operation 4 | Operation 5 | Operation 6 |
| --- | --- | --- | --- | --- | --- | --- |
| Raw material air compressor | Pressurization of first adsorption tank | Pressurization of first adsorption tank | Pressurization of compressed raw material air tank | Pressurization of second adsorption tank | Pressurization of second adsorption tank | Pressurization of compressed raw material air tank |
| Compressed raw material air tank | Depressurization (pressurization of first adsorption tank) | Standby | Pressurization | Depressurization (pressurization of second adsorption tank) | Standby | Pressurization |
| First adsorption tank | Pressurization and adsorption | Pressurization and adsorption | Depressurization and equalization | Depressurization and regeneration | Depressurization and regeneration | Pressurization and equalization |
| Second adsorption tank | Depressurization and regeneration | Depressurization and regeneration | Pressurization and equalization | Pressurization and adsorption | Pressurization and adsorption | Depressurization and equalization |

<<Operation 1>>

In the operation 1 illustrated in FIG. 2A, the first adsorption tank 4A is in the state of performing the pressurization and raw material air tank 3 to the first adsorption tank 4A can be regulated. As a result, when the compressed raw material air is supplied from the compressed raw material air tank 3, rapid introduction of the compressed raw material air, which can cause disturbance of the concentration distribution inside the first adsorption tank 4A and have an adverse effect on performance, can be prevented.

<<Operation 2>>

Figure 2B:
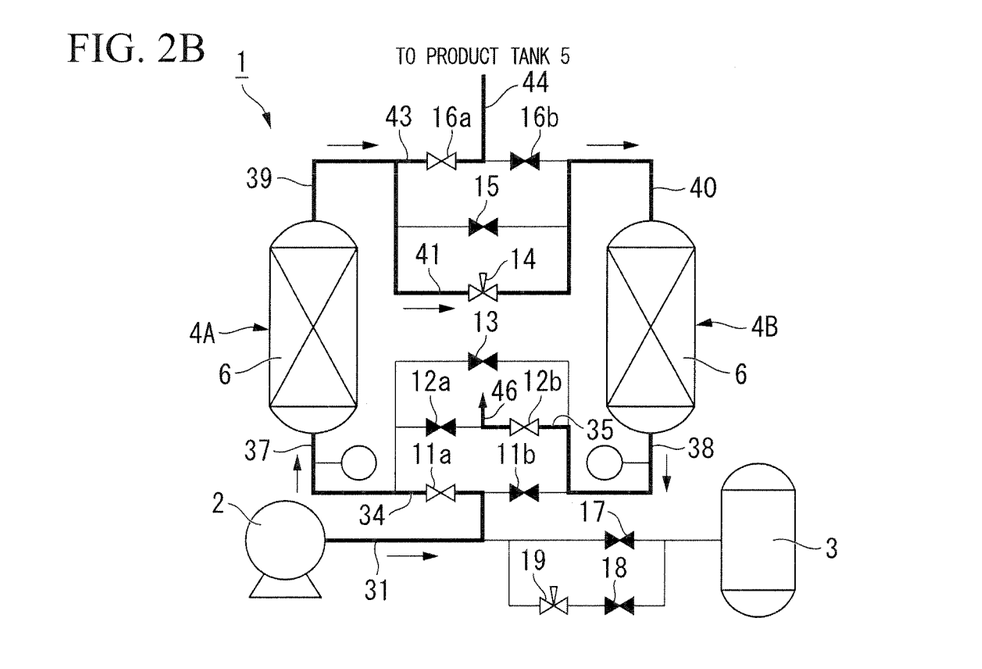
FIG. 2B is a process diagram showing the flow during an operation 2 of the nitrogen-enriched gas manufacturing method according to an embodiment of the present invention.

Next, the operation 2 is described with reference to FIG. 2B.

The switching from the operation 1 to the operation 2 is preferably performed when the pressure difference between the first adsorption tank 4A and the compressed raw material air tank 3 disappears.

In the operation 2, in a similar manner to that described in the operation 1, the first adsorption tank 4A is in the state of performing the pressurization and adsorption step, and the second adsorption tank 4B is in the state of performing the depressurization and regeneration step.

However, unlike the operation 1, the compressed raw material air tank outlet valve 18 is closed, and therefore compressed raw material air is not supplied from the compressed raw material air tank 3, and the supply of compressed raw material air to the first adsorption tank 4A comes only from the raw material air compressor 2.

The other on-off valves are in the same state as described in the operation 1.

<<Operation 3>>

Figure 2C:
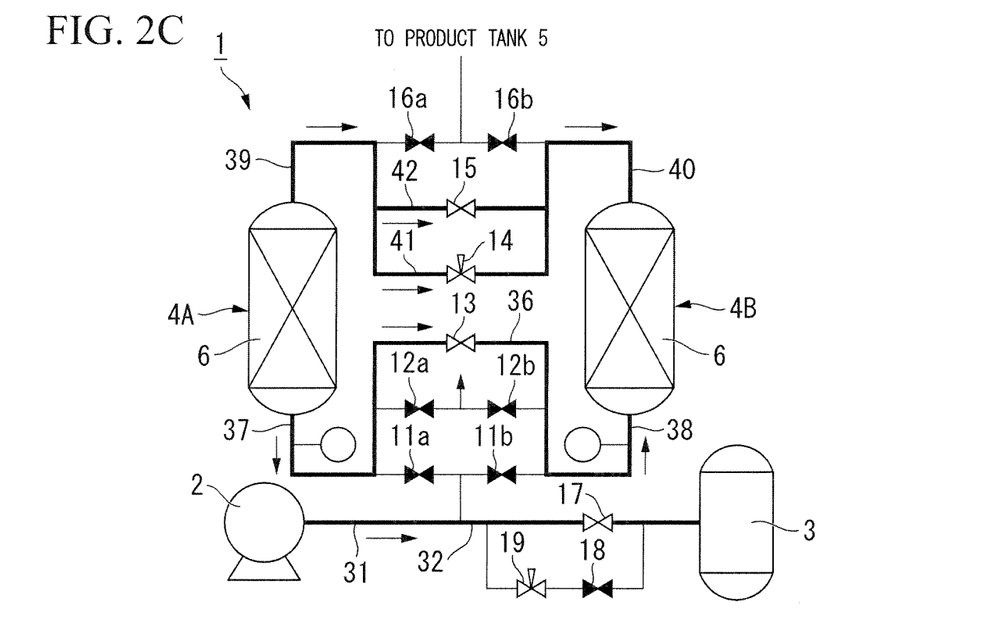
FIG. 2C is a process diagram showing the flow during an operation 3 of the nitrogen-enriched gas manufacturing method according to an embodiment of the present invention.

Next, the operation 3 is described with reference to FIG. 2C.

In the operation 3, the first adsorption tank 4A has been switched from the pressurization and adsorption step to the depressurization and equalization step, and the second adsorption tank 4B has been switched from the depressurization and regeneration step to the pressurization and equalization step. Specifically, the pressure equalizing valves 13 and 15, and the compressed raw material air tank inlet valve 17 are open, and the other on-off valves are closed.

In this operation 3, because the pressure equalizing valve 13 is open, the relatively high-pressure gas inside the first adsorption tank 4A passes from the downstream side of the first adsorption tank 4A, through the lines 39, 42 and 40, and is introduced into the second adsorption tank 4B from the downstream side of the second adsorption tank 4B.

At this time, because the flow rate is regulated by the flow rate regulating mechanism 14, the majority of the gas discharged from the first adsorption tank 4A does not pass through the line 41, but rather passes through the line 42 into the second adsorption tank 4B.

Further, because the pressure equalizing valve 13 is open, the relatively high-pressure gas inside the first adsorption tank 4A also passes from the upstream side of the first adsorption tank 4A, through the lines 37, 36 and 38, and is introduced into the second adsorption tank 4B from the upstream side of the second adsorption tank 4B.

Furthermore, because the compressed raw material air tank inlet valve 17 is open, the compressed raw material air discharged from the raw material air compressor 2 is introduced into the compressed raw material air tank 3 and stored.

This pressure equalization step is performed so as to enable recovery of the relatively high-pressure gas remaining inside the first adsorption tank 4A at the completion of the pressurization and adsorption step within the second adsorption tank 4B which has completed the depressurization and regeneration step.

<<Operation 4>>

Figure 2D:
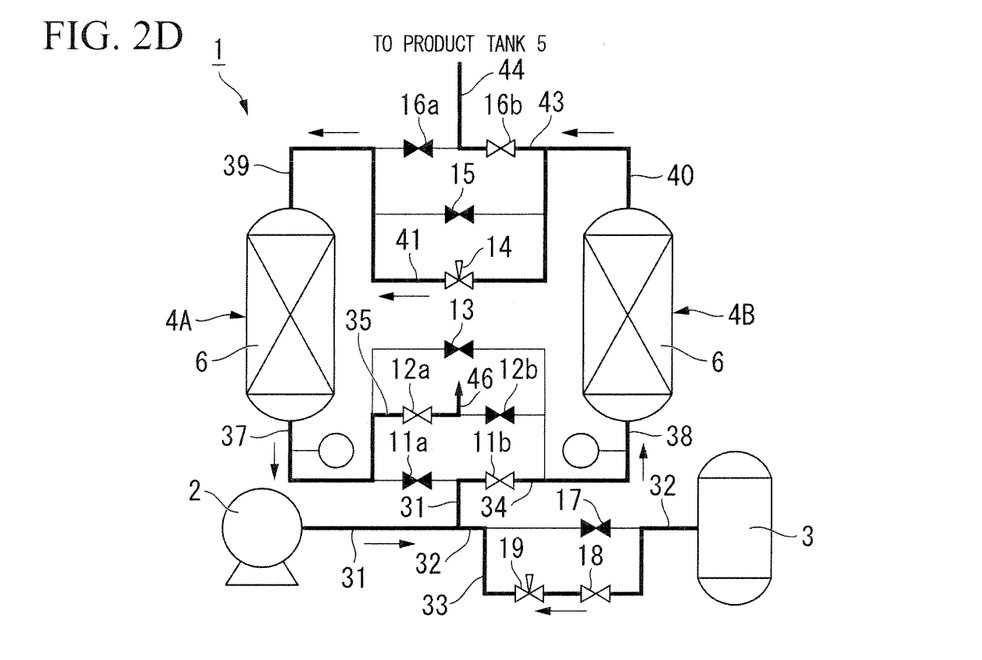
FIG. 2D is a process diagram showing the flow during an operation 4 of the nitrogen-enriched gas manufacturing method according to an embodiment of the present invention.

Next is a description of the operation 4 illustrated in FIG. 2D.

In the operation 4, the first adsorption tank 4A has been switched to the depressurization and regeneration step, and the second adsorption tank 4B has been switched to the pressurization and adsorption step. Specifically, the inlet valve 11b, the exhaust valve 12a, the outlet valve 16b, and the compressed raw material air tank outlet valve 18 are open, and the other on-off valves are closed.

Because the inlet valve 11b is open, the compressed raw material air that has been compressed by the raw material air compressor 2 passes through the lines 31, 34 and 38 and into the second adsorption tank 4B, thereby pressurizing the inside of the second adsorption tank 4B. Then, the unwanted components such as oxygen and carbon dioxide within the raw material air are adsorbed preferentially to the adsorbent 6 inside the second adsorption tank 4B, yielding a nitrogen-enriched gas in which the nitrogen has been concentrated. Because the outlet valve 16b is open, this obtained nitrogen-enriched gas is discharged from the second adsorption tank 4B, and passes through the lines 40, 43 and 44 into the product tank 5.

Further, because the exhaust valve 12a is open, the first adsorption tank 4A is open to the atmosphere via the lines 37, 35 and 46, and therefore the pressure inside the first adsorption tank 4A decreases, and the unwanted components desorb from the adsorbent 6 inside the first adsorption tank 4A, thus regenerating the adsorbent 6.

At this time, a portion of the nitrogen-enriched gas discharged from the second adsorption tank 4B passes through the lines 40, 41 and 39, at a flow rate regulated by the flow rate regulating mechanism 14, and enters the first adsorption tank 4A from the downstream side of the first adsorption tank 4A. This introduced nitrogen-enriched gas purges the inside of the first adsorption tank 4A, thereby accelerating the regeneration of the adsorbent 6 inside the first adsorption tank 4A.

Further, because the compressed raw material air tank outlet valve 18 is open, the raw material air stored in the compressed raw material tank 3 passes through the branch line 32 and the lines 33, 31, 34 and 38, at an appropriate flow rate regulated by the compressed raw material air tank outlet flow rate regulating mechanism 19, and is introduced into the second adsorption tank 4B and used as a portion of the gas for pressurizing the second adsorption tank 4B.

In other words, in the operation 4, supply of the compressed raw material air to the second adsorption tank 4B occurs from both the raw material air compressor 2 and the compressed raw material air tank 3.

<<Operation 5>>

Figure 2E:
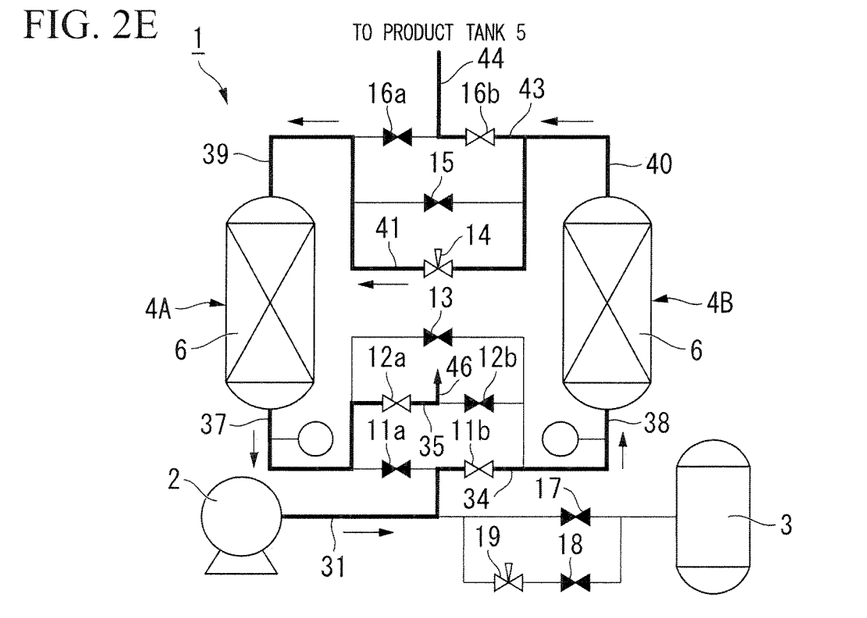
FIG. 2E is a process diagram showing the flow during an operation 5 of the nitrogen-enriched gas manufacturing method according to art embodiment of the present invention.

Next, the operation 5 is described with reference to FIG. 2E.

The switching from the operation 4 to the operation 5 is preferably performed when the pressure difference between the second adsorption tank 4B and the compressed raw material air tank 3 disappears.

In the operation 5, in a similar manner to that described in the operation 4, the first adsorption tank 4A is in the state of performing the depressurization and regeneration step, and the second adsorption tank 4B is in the state of performing the pressurization and adsorption step.

However, unlike the operation 4, in the operation 5 the compressed raw material air tank outlet valve 18 is closed, and therefore compressed raw material air is not supplied from the compressed raw material air tank 3, and the supply of compressed raw material air to the second adsorption tank 4B comes only from the raw material air compressor 2.

The other on-off valves are in the same state as described in the operation 4.

<<Operation 6>>

Figure 2F:
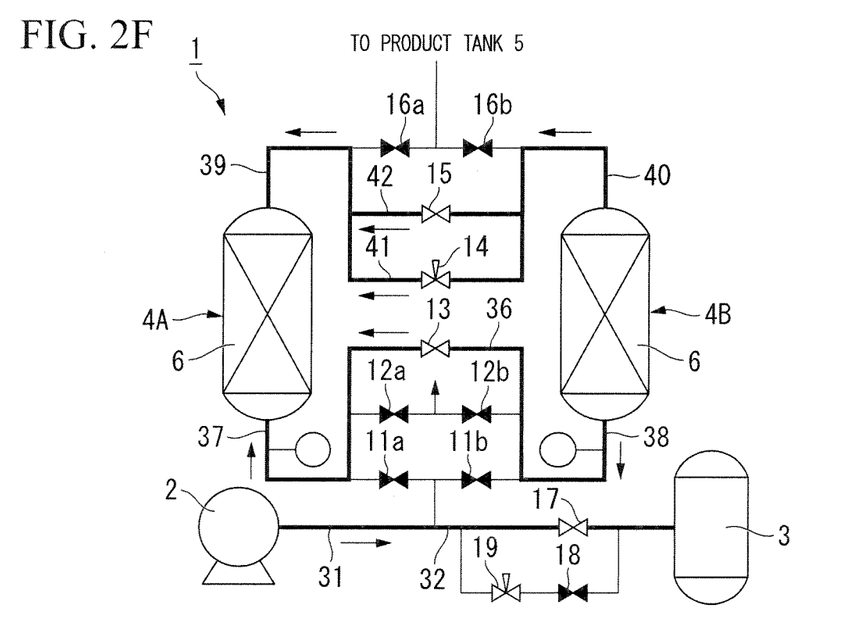
FIG. 2F is a process diagram showing the flow during an operation 6 of the nitrogen-enriched gas manufacturing method according to an embodiment of the present invention.

Next, the operation 6 is described with reference to FIG. 2F.

In the operation 6, the first adsorption rank 4A has been switched from the depressurization and regeneration step to the pressurization and equalization step, and the second adsorption tank 4B has been switched from the pressurization and adsorption step to the depressurization and equalization step. Specifically, the pressure equalizing valves 13 and 15, and the compressed raw material air tank inlet valve 17 are open, and the other on-off valves are closed.

Because the pressure equalizing valve 15 is open, the relatively high-pressure gas inside the second adsorption tank 4B passes from the downstream side of the second adsorption tank 4B, through the lines 40, 42 and 39, and is introduced into the first adsorption tank 4A from the downstream side of the first adsorption tank 4A.

At this time, because the flow rate is regulated by the flow rate regulating mechanism 14, the majority of the gas discharged from the downstream side of the second adsorption tank 4B does not pass through the line 41, but rather passes through the line 42 into the first adsorption tank 4A.

Further, because the pressure equalizing valve 13 is open, the relatively high-pressure gas inside the second adsorption tank 4B also passes from the upstream side of the second adsorption tank 4B, through the lines 38, 36 and 37, and is introduced into the first adsorption tank 4A from the upstream side of the first adsorption tank 4A.

Furthermore, because the compressed raw material air tank inlet valve 17 is open, the compressed raw material air discharged from the raw material air compressor 2 is introduced into the compressed raw material air tank 3 and stored.

This pressure equalization step is performed so as to enable recovery of the relatively high-pressure gas remaining inside the second adsorption tank 4B at the completion of the pressurization and adsorption step within the first adsorption tank 4A which has just completed the depressurization and regeneration step.

By repeating the pressurization and adsorption step, the depressurization and equalization step, the depressurization and regeneration step, and the pressurization and equalization step, a nitrogen-enriched gas can be separated from the raw material air containing nitrogen.

In the present embodiment, the raw material air compressor can be used stably in a continuous manner rather than intermittently, and therefore the maximum (rated) air flow capacity of the raw material air compressor can be reduced, resulting in better power saving for the nitrogen PSA apparatus.

Specifically, in the present embodiment, by supplying and discharging compressed raw material air to and from the compressed raw material air tank 3, load variation for the raw material air compressor 2 can be prevented. In other words, even in the pressure equalization steps when the raw material air that has been compressed by the raw material air compressor 2 is not being supplied to the first adsorption tank 4A or the second adsorption tank 4B, or when the flow rate of the supplied raw material air is being restricted, the raw material air compressor 2 need not be switched to no-load operation, and the compressed raw material air can be supplied to the compressed raw material air tank 3.

Accordingly, a device that has sufficient performance to satisfy the maximum air flow capacity required by the nitrogen-enriched gas manufacturing apparatus 1 can be selected as the raw material air compressor 2.

Because the raw material air compressor 2 can be used at a stable air flow capacity, the maximum air flow capacity required can be reduced, resulting in a reduction in the power consumption of the raw material air compressor 2.

Figure 3:
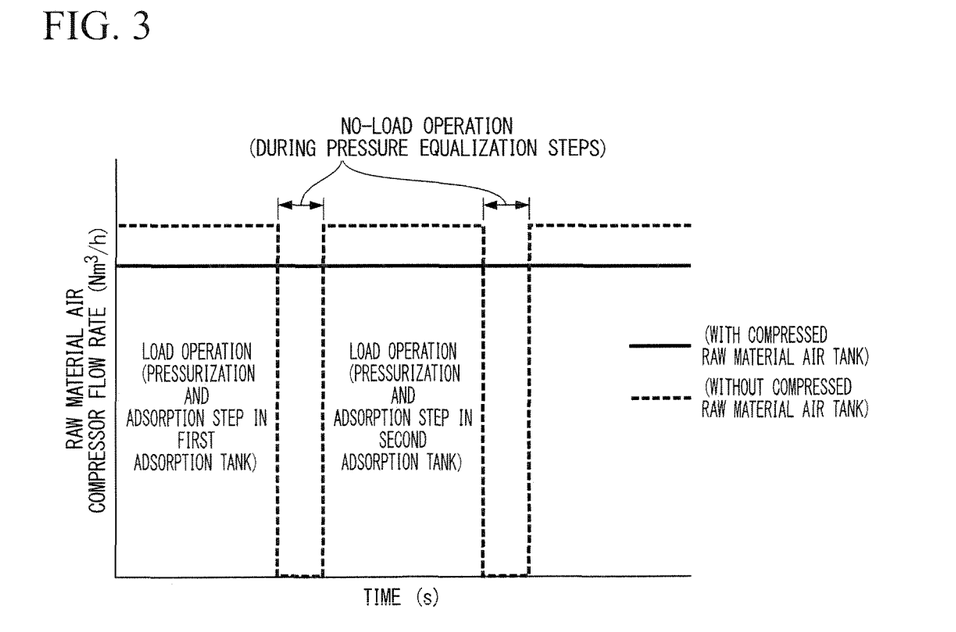
FIG. 3 is a graph illustrating the required air flow capacity of the raw material air compressor with and without a compressed raw material air tank in a nitrogen-enriched gas manufacturing apparatus using the PSA method.

An outline of the required air flow capacities of the raw material art compressors in PSA-type nitrogen-enriched gas manufacturing apparatuses having the same level of performance but differing in terms of the presence or absence of the compressed raw material air tank is shown in FIG. 3.

As is evident from FIG. 3, when the compressed raw material air tank is absent, the raw material air compressor is switched to no-load operation during the pressure equalization steps, and therefore the maximum value for the flow rate required from the raw material air compressor during the pressurization and adsorption step is greater compared with the case where the compressed raw material air tank is present.

In this manner, by employing the present embodiment the maximum value for the flow rate of the raw material air compressor 2 can be lowered, leading to a reduction in the equipment power consumption.

Further, in the present embodiment, as a result of using the compressed raw material air tank 3, the raw material air compressor 2 need not be switched to no-load operation during the pressure equalization steps, and therefore air loss associated with the time required to switch from no-load operation to load operation can be prevented.

While the present invention has been described above on the basis of an embodiment, the invention is in no way limited by the above embodiment, and various modifications are possible without departing from the scope of the present invention.

For example, in the embodiment described above, a description was provided of the case in which a nitrogen-enriched gas was produced from a raw material air, but the combination of the raw material gas and the product gas is not necessarily limited to this particular combination, and the invention can be applied broadly to any gas separation method which uses an adsorbent to recover an easily adsorbed component and a poorly adsorbed component from a raw material gas. Such a gas separation method can be described by simply substituting the unwanted components such as oxygen and carbon dioxide from the above embodiment with the easily adsorbed component, substituting the nitrogen with the poorly adsorbed component, and substituting the compressed raw material air tank with a compressed raw material gas tank.

Furthermore, the position of the compressed raw material air tank 3 which branches off the line between the raw material air compressor 2, the first adsorption tank 4A and the second adsorption tank 4B is not limited to the configuration shown in FIG. 1.

Any configuration may be used which enables the compressed raw material air to be stored in the compressed raw material air tank 3 during the pressurization and equalization step or the depressurization and equalization step without having to switch the raw material air compressor 2 to no-load operation, and has a flow rate regulation mechanism that enables the compressed raw material air stored inside the compressed raw material air tank 3 to be used as a portion of the gas for pressurizing the inside of the first adsorption tank 4A (or the second adsorption tank 4B) during the pressurization and adsorption step.

Figure 4:
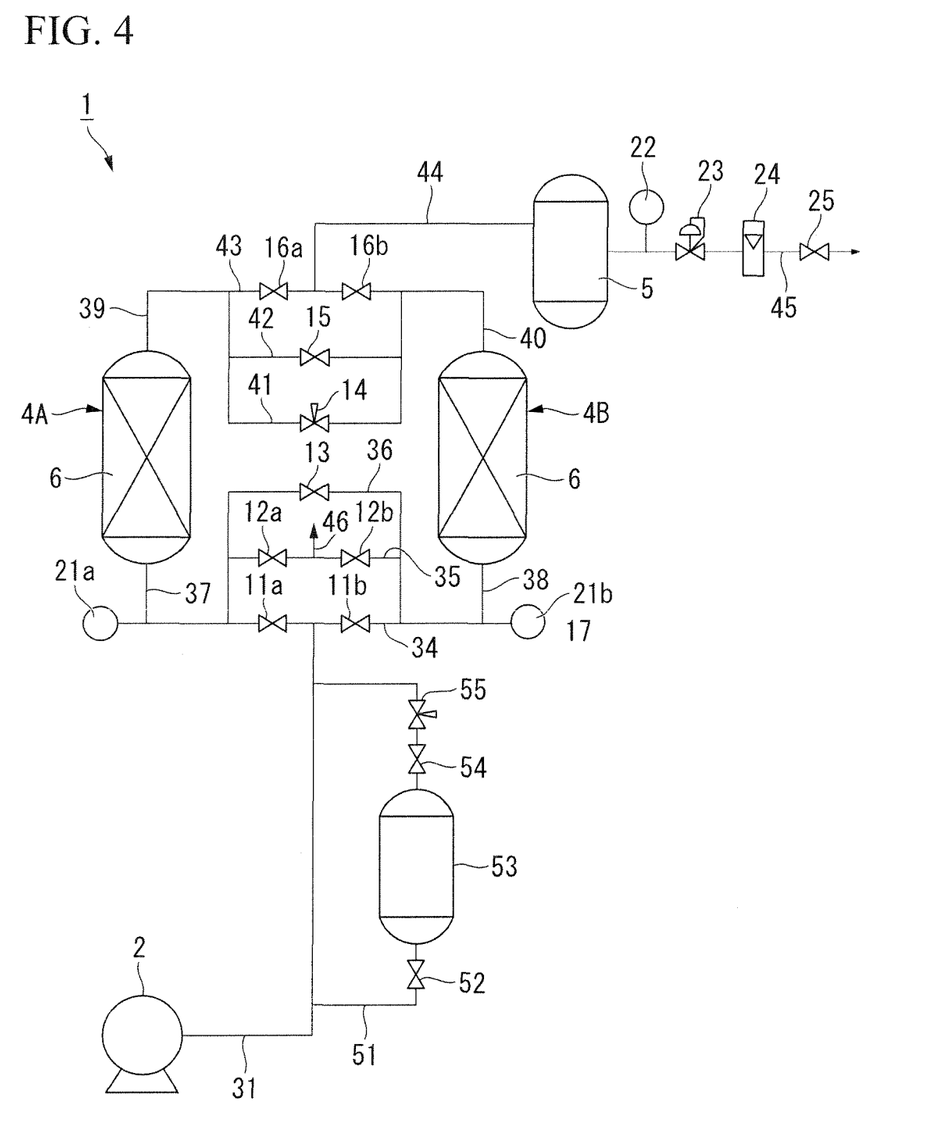
FIG. 4 is a system diagram illustrating an outline of a nitrogen-enriched gas manufacturing apparatus according to another embodiment of the present invention.

For example, a configuration such as that illustrated in FIG. 4, in which both ends of a branch line 51 are connected to the line 31, and a compressed raw material air tank inlet valve 52, a compressed raw material air tank 53, a compressed raw material air tank outlet valve 54 and a compressed raw material air tank outlet flow rate regulating mechanism 55 are provided in that sequence in the branched line 51, with the inlet valve 52 positioned closest to the raw material air compressor 2, may also be used.

In this case, the compressed raw material air tank inlet valve 52 and the compressed raw material air tank outlet valve 54 are opened during the pressurization and equalization step (or the depressurization and equalization step). The raw material air from the raw material air compressor 2 is introduced into the compressed raw material air tank 53 through the compressed raw material air tank inlet valve 52 and the compressed raw material air tank outlet valve 54.

Then, during the pressurization and adsorption step (or the depressurization and regeneration step), by closing the on-off valve 52, compressed raw material air is supplied to the first adsorption tank 4A (or the second adsorption tank 4B) from both the raw material air compressor 2 and the compressed raw material air tank 53. It is preferable that the compressed raw material air tank outlet valve 54 is closed when the pressure difference between the compressed raw material air tank 53 and the first adsorption tank 4A (or the second adsorption tank 4B) that is performing the pressurization and adsorption step has substantially disappeared.

EXAMPLES

The differences in the effects obtained between the case where a compressed raw material air tank is provided and the case where a compressed raw material air tank is not provided are described below using an example and a comparative example. However, the present invention is in no way limited by the following examples.

In the example (with a compressed raw material air tank), a nitrogen-enriched gas manufacturing apparatus having the type of system illustrated in FIG. 1 and described in the aforementioned embodiment was used, and a nitrogen-enriched gas was manufactured by performing the operations illustrated in FIG. 2A to FIG. 2F.

In the comparative example (without a compressed raw material air tank), a nitrogen-enriched gas manufacturing apparatus having the type of system illustrated in FIG. 7 and lacking a compressed raw material air tank was used, and a nitrogen-enriched gas was manufactured by repeating a pressurization and adsorption step, a depressurization and equalization step, a depressurization and regeneration step, and a pressurization and equalization step.

Figure 5:
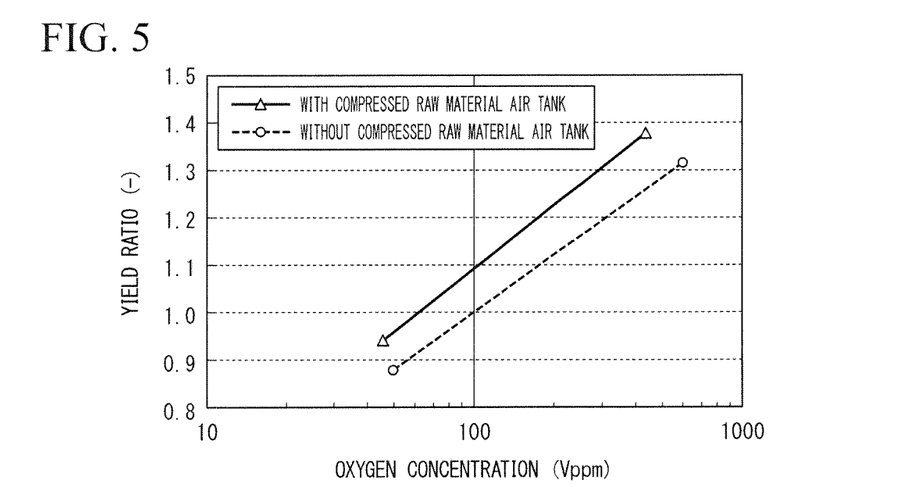
FIG. 5 is a graph illustrating the relationship between the yield and the oxygen concentration in the product gas, with and without a compressed raw material air tank.
Figure 6:
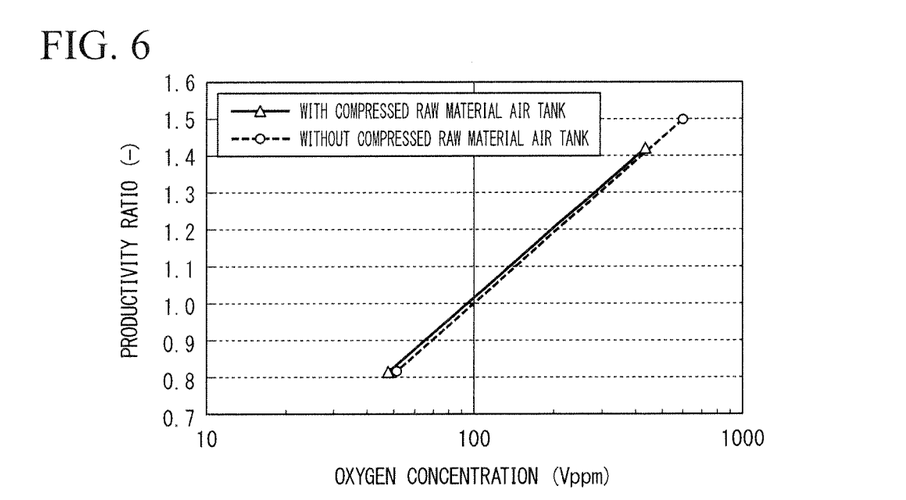
FIG. 6 is a graph illustrating the relationship between the productivity and the oxygen concentration in the product gas, with and without a compressed raw material air tank.

The yield results for the example and the comparative example are shown in FIG. 5, and the productivity results are shown in FIG. 6. In FIG. 5, the vertical axis represents the yield ratio, which is the value obtained by dividing the yield value at each oxygen concentration by the yield obtained at an oxygen concentration value of 100 (Vppm) when a compressed raw material air tank is not used. Further, in FIG. 6, the vertical avis represents the productivity ratio, which is the value obtained by dividing the productivity value at each oxygen concentration by the productivity obtained at an oxygen concentration value of 100 (Vppm) when a compressed raw material air tank is not used.

Here, the yield (%) indicates the value of product nitrogen-enriched gas flow rate ($Nm^3/h$)/compressed raw material air maximum required flow rate ($Nm^3/h$), whereas the productivity ($Nm^3/h \cdot ton$) indicates the value of product nitrogen-enriched gas flow rate ($Nm^3/h$)/amount of adsorbent packing (ton).

As shown in FIG. 5, it was confirmed that by including the compressed raw material air tank, the yield ratio at an oxygen concentration within the product gas of 100 ppm improved approximately 8%.

Accordingly, by employing a process that includes the addition of a compressed raw material air tank, the required air flow capacity of the raw material air compressor can be reduced significantly, enabling the equipment power consumption to be reduced by a corresponding amount.

Furthermore, as shown in FIG. 6, there is no deterioration in the productivity of the apparatus, regardless of the presence or absence of the compressed raw material air tank, and therefore it can be said that by introducing the compressed raw material air stored in the compressed raw material air tank into the adsorption tank, with appropriate regulation of the flow rate by the compressed raw material air tank outlet flow rate regulating mechanism, the introduced compressed raw material air can be used as a portion of the pressurizing gas without disturbing the concentration distribution inside the adsorption tank.

FIG. 5 and FIG. 6 both show measurement results for the case where the flow rate of the raw material air introduced into the adsorption tank is altered so that the maximum attained pressure inside the adsorption tank during the pressurization and adsorption step is constant, but if the flow rate of the raw material air introduced into the adsorption tank is kept constant, and the maximum attained pressure inside the adsorption tank is changed, then including the compressed raw material air tank enables a higher maximum attained pressure inside the adsorption tank than the case in which no compressed raw material air tank is used, meaning the adsorption performance of the adsorbent improves, and the productivity performance also improves.

INDUSTRIAL APPLICABILITY

According to the present invention, the raw material air compressor can be used stably in a continuous manner rather than intermittently, and the maximum flow capacity required, of the raw material air compressor can be reduced, resulting in better power saving for the nitrogen PSA apparatus, and therefore the present invention is very useful industrially.

DESCRIPTION OF THE REFERENCE SIGNS

1: Nitrogen-enriched gas manufacturing apparatus
2: Raw material air compressor
3, 53: Compressed raw material air tank
4A: First adsorption tank
4B: Second adsorption tank
5: Product tank
6: Adsorbent
11a, 11b: Inlet valve
12a, 12b: Exhaust valve
13, 15: Pressure equalizing valve
14: Flow rate regulating mechanism
16a, 16b: Outlet valve
17, 52: Compressed raw material air tank inlet valve
18, 54: Compressed raw material air tank outlet valve
19, 55: Compressed raw material air tank outlet flow rate regulating mechanism
31, 33 to 44: Line
32, 51: Branched line

The invention claimed is:

1. A nitrogen-enriched gas manufacturing method for separating a nitrogen-enriched gas from a raw material air containing nitrogen gas using a plurality of adsorption tanks packed with an adsorbent the method comprising:
a pressurization and adsorption step of pressurizing an inside of a first adsorption tank by introducing the raw material air, which has been compressed by a compressor, into the first adsorption tank, and preferentially adsorbing unwanted components within the raw material air to an adsorbent inside the first adsorption tank, thus obtaining a gas containing concentrated nitrogen, a depressurization and equalization step of introducing a gas remaining inside the first adsorption tank into a second adsorption tank, a depressurization and regeneration step of introducing the raw material air which has been compressed by the compressor into the second adsorption tank, lowering a pressure inside the first adsorption tank by opening the first adsorption tank to an open atmosphere, and desorbing the unwanted components from the adsorbent inside the first adsorption tank, thereby regenerating the adsorbent inside the first adsorption tank, and a pressurization and equalization step of introducing a gas remaining inside the second adsorption tank into the first adsorption tank, wherein in the pressurization and equalization step, the raw material air which has been compressed by the compressor is stored in a compressed raw material air tank provided on a branch from a line between the compressor and the first adsorption tank, and in the pressurization and adsorption step, the raw material air stored in the compressed raw material air tank is directly supplied to a line between the first adsorption tank and the compressor, and introduced into the first adsorption tank and used as a portion of a gas that pressurizes the inside of the first adsorption tank.

2. A gas separation method of separating an easily adsorbed component which adsorbs readily to an adsorbent, and a poorly adsorbed component which adsorbs poorly to the adsorbent, from a raw material gas comprising the easily adsorbed component and the poorly adsorbed component, using a plurality of adsorption tanks packed with the adsorbent, the method comprising:

a pressurization and adsorption step of pressurizing an inside of a first adsorption tank by introducing the raw material gas, which has been compressed by a compressor, into the first adsorption tank, and preferentially adsorbing the easily adsorbed component within the raw material gas to the adsorbent inside the first adsorption tank, thus obtaining a gas in which the poorly adsorbed component has been concentrated, a depressurization and equalization step of introducing a relatively high-pressure gas remaining inside the first adsorption tank into a second adsorption tank, a depressurization and regeneration step of introducing the raw material gas which has been compressed by the compressor into the second adsorption tank, lowering a pressure inside the first adsorption tank by opening the first adsorption tank to an open atmosphere, and desorbing the easily adsorbed component from the adsorbent inside the first adsorption tank, thereby regenerating the adsorbent inside the first adsorption tank, and a pressurization and equalization step of introducing a gas remaining inside the second adsorption tank into the first adsorption tank, wherein in the pressurization and equalization step, the raw material gas which has been compressed by the compressor is stored in a compressed raw material gas tank provided on a branch from a line between the compressor and the first adsorption tank, and in the pressurization and adsorption step, the compressed raw material gas stored in the compressed raw material gas tank is directly supplied to a line between the first adsorption tank and the compressor, and introduced into the first adsorption tank and used as a portion of a gas that pressurizes the inside of the first adsorption tank.

3. A nitrogen-enriched gas manufacturing apparatus for separating a nitrogen-enriched gas from a raw material air containing nitrogen gas using a plurality of adsorption tanks packed with an adsorbent, the apparatus comprising:

a compressor which compresses the raw material air, a plurality of adsorption tanks into which the raw material air that has been compressed by the compressor is introduced, a line which connects the compressor and the adsorption tanks, a branch line which is provided as a branch from the line, and a compressed raw material air tank which is connected to the branch line, wherein the compressed raw material air tank has a function of storing the raw material air that has been compressed by the compressor when the adsorption tanks are not being supplied with compressed raw material air from the compressor, or when a flow rate of the compressed raw material air is being restricted, and has a function of directly supplying the raw material air that has been stored inside the compressed raw material air tank to a line between the adsorption and the compressor, and supplying the raw material air to the adsorption tank to act as a portion of a pressurizing gas when an interior of the adsorption tank is being pressurized.

\* \* \* \* \*